(12) United States Patent
Sakamoto et al.

(10) Patent No.: US 12,025,529 B2
(45) Date of Patent: Jul. 2, 2024

(54) PLASTIC OPTICAL FIBER CORE DIAMETER MEASURING METHOD, PLASTIC OPTICAL FIBER CORE DIAMETER MEASURING APPARATUS USED THEREFOR, PLASTIC OPTICAL FIBER DEFECT DETECTING METHOD, AND PLASTIC OPTICAL FIBER DEFECT DETECTING APPARATUS USED THEREFOR

(71) Applicant: NITTO DENKO CORPORATION, Ibaraki (JP)

(72) Inventors: Masaru Sakamoto, Ibaraki (JP); Ichiro Suehiro, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 304 days.

(21) Appl. No.: 17/427,829

(22) PCT Filed: Feb. 3, 2020

(86) PCT No.: PCT/JP2020/003967
§ 371 (c)(1),
(2) Date: Aug. 2, 2021

(87) PCT Pub. No.: WO2020/162409
PCT Pub. Date: Aug. 13, 2020

(65) Prior Publication Data
US 2022/0146371 A1 May 12, 2022

(30) Foreign Application Priority Data
Feb. 4, 2019 (JP) .................................. 2019-018118
Feb. 3, 2020 (JP) .................................. 2020-015936

(51) Int. Cl.
*G01M 11/02* (2006.01)
*G01B 11/08* (2006.01)

(52) U.S. Cl.
CPC ......... *G01M 11/0257* (2013.01); *G01B 11/08* (2013.01)

(58) Field of Classification Search
CPC ........................... G01M 11/0257; G01B 11/08
See application file for complete search history.

(56) References Cited

U.S. PATENT DOCUMENTS 4,882,497 A    11/1989   Inoue et al.
2007/0188739 A1*   8/2007   Aoshima .............. G01N 21/896
                                                              356/73.1

(Continued)

FOREIGN PATENT DOCUMENTS

| CN | 1938580 A | 3/2007 |
| CN | 101120231 A | 2/2008 |

(Continued)

OTHER PUBLICATIONS

English translation of JP20070188739.*

(Continued)

*Primary Examiner* — Rebecca C Bryant
(74) *Attorney, Agent, or Firm* — WHDA, LLP

(57) ABSTRACT

The present disclosure relates to a plastic optical fiber (POF) core diameter measuring method and a POF core diameter measuring apparatus, and a POF defect detecting method, and a POF defect detecting apparatus used therefor. Light irradiation mechanisms are provided for irradiating a side of a POF with light, with imaging mechanisms provided on the opposite side of the POF from the light irradiation mechanisms; and a data processing mechanism for processing image data on the POF acquired from the imaging mechanisms to calculate the core diameter of the POF. The ratio (D/W) of the shortest distance D to a light emission width W is in the range of 0.9 to 1.3 where W is the light emission width of the light irradiation mechanisms and D is the (Continued)

shortest distance between a light emission position of the light irradiation mechanisms and the side of the POF.

18 Claims, 9 Drawing Sheets

(56) References Cited

U.S. PATENT DOCUMENTS

| | | |
|---|---|---|
| 2008/0068594 A1 | 3/2008 | Tobisaka et al. |
| 2016/0139062 A1 | 5/2016 | Faraldi et al. |
| 2019/0049372 A1 | 2/2019 | Kohda et al. |

FOREIGN PATENT DOCUMENTS

| | | |
|---|---|---|
| CN | 105378444 A | 3/2016 |
| CN | 105890872 A | 8/2016 |
| CN | 108885182 A | 11/2018 |
| CN | 109115787 A | 1/2019 |
| JP | S51120242 A | 10/1976 |
| JP | S5797263 U1 | 6/1982 |
| JP | S63165726 A | 7/1988 |
| JP | 108122556 A | 5/1996 |
| JP | 2008304239 A | 12/2008 |
| JP | 2014002002 A | 1/2014 |
| JP | 2016085138 A | 5/2016 |
| WO | 2014206450 A1 | 12/2014 |

OTHER PUBLICATIONS

Office Action dated Jan. 28, 2023, issued in counterpart CN Application No. 202080012417.3, with its English machine translation. (41 pages).

English Translation of International Preliminary Report on Patentability, dated Aug. 19, 2021, issued in counterpart International Application No. PCT/JP2020/003967 (12 pages).

International Search Report dated Mar. 31, 2020, issued in counterpart application No. PCT/JP2020/003967 (w/ English translation; 6 pages).

Office Action dated Jul. 25, 2023, issued in counterpart TW application No. 109103273, with English translation. (36 pages).

Office Action dated Aug. 8, 2023, issued in counterpart JP application No. 2020-015936, with English translation. (10 pages).

\* cited by examiner

Diameter of Core 4

Solid Circles & Solid Lines: Values Measured by Apparatus of FIG. 7
Open Circles & Broken Lines: Actually Measured Values (Based on Microscopic Cross-Sectional Images)

FIG.10

Eccentricity of Core 4

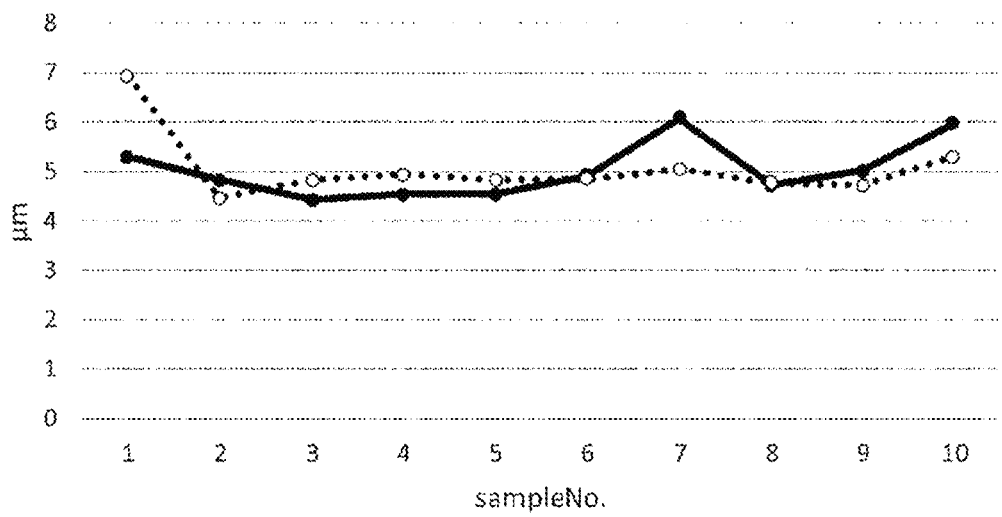

Solid Circles & Solid Lines: Values Measured by Apparatus of FIG. 7
Open Circles & Broken Lines: Actually Measured Values (Based on Microscopic Cross-Sectional Images)

FIG.11

Diameter of Core 4

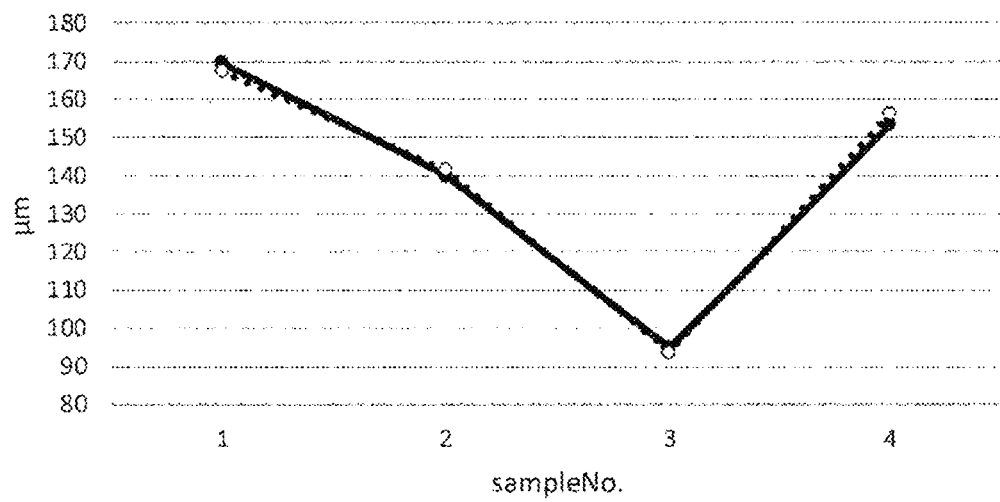

Solid Circles & Solid Lines: Values Measured by Apparatus of FIG. 1
Open Circles & Broken Lines: Actually Measured Values (Based on Microscopic Cross-Sectional Images)

Solid Circles & Solid Lines: Values Measured by Apparatus of FIG. 1
Open Circles & Broken Lines: Actually Measured Values (Based on Microscopic Cross-Sectional Images)

PLASTIC OPTICAL FIBER CORE DIAMETER MEASURING METHOD, PLASTIC OPTICAL FIBER CORE DIAMETER MEASURING APPARATUS USED THEREFOR, PLASTIC OPTICAL FIBER DEFECT DETECTING METHOD, AND PLASTIC OPTICAL FIBER DEFECT DETECTING APPARATUS USED THEREFOR

TECHNICAL FIELD

The present disclosure relates to a method of measuring the core diameter of a plastic optical fiber (referred to hereinafter as a "POF" in some cases) used for communication applications and the like, a POF core diameter measuring apparatus used therefor, a POF defect detecting method, and a POF defect detecting apparatus used therefor. More particularly, the present disclosure relates to a method and apparatus that are capable of continuously measuring the core diameter of a POF in an in-line fashion in the steps of manufacturing the POF, and a method and apparatus that are capable of detecting defects in the POF.

BACKGROUND ART

Demand for POFs has been increasing in recent years because the POFs which are made of plastic are lightweight, have good flexibility, and can be manufactured at low costs. In general, such POFs are manufactured by melt extrusion or by a method of melt-heating and drawing preforms by means of an interfacial gel polymerization process, and the like. Unfortunately, if an apparatus for manufacturing the POFs is continuously operated for a long time, there are cases in which it is difficult to ensure uniform quality.

For this reason, PTL 1 proposes an inspection apparatus that measures optical transmission losses while manufacturing POFs for the purpose of improving the product quality (transmission losses of optical signals) of the POFs to be manufactured, for example. In addition, PTL 2 proposes an abnormal coating portion detection method for detecting abnormal portions of coatings of polymer clad optical fibers to meet the demands for reliability.

However, the apparatus disclosed in PTL 1 actually passes laser light through the core of a POF to check the degree of scattering of the laser light, thereby measuring the optical losses of the POF. This apparatus is capable of judging whether the core has defects (foreign materials, cracks, bubbles, and the like) or not, but is not capable of measuring the diameter of the formed core.

The method disclosed in PTL 2 introduces inspection light into a POF to judge whether the inspection light leaking out from an abnormal portion of a coated clad is present or absent by a change in brightness of an image of the POF over time, thereby detecting the abnormal portion, based on the judgment. However, this method as well as the apparatus disclosed in PTL 1 mentioned above is not capable of measuring the diameter of the formed core.

RELATED ART DOCUMENT

Patent Document

PTL 1: JP-A-2014-2002
PTL 2: JP-A-2016-85138

SUMMARY

On the other hand, fluctuations in core diameter of a POF lead to a decrease in bandwidth. It is hence important to provide a POF having a constantly stable core diameter in increasing the reliability of optical communications. Thus, there is a strong need to establish a technique for continuous accurate measurement of core diameters because this technique is capable of excluding only cores having diameters falling outside a specified range in an in-line fashion. The establishment of a technique for continuous detection of defects in POFs is also expected because this technique is capable of excluding only defective portions in an in-line fashion.

In view of the foregoing, it is therefore an object of the present disclosure to provide a POF core diameter measuring method capable of accurately measuring the core diameter of a POF, a POF core diameter measuring apparatus used therefor, a POF defect detecting method, and a POF defect detecting apparatus used therefor.

To accomplish the aforementioned object, the present disclosure provides the following [1] to [14].

[1] A method of measuring a core diameter of a POF, comprising: an imaging step in which there are provided a light irradiation mechanism for directing light toward one side of the POF and an imaging mechanism for imaging the opposite side of the POF from the side irradiated with light, the imaging step being the step of irradiating the side of the POF with light by means of the light irradiation mechanism and imaging the opposite side of the POF to acquire image data by means of the imaging mechanism; and a data processing step of processing the image data on the POF acquired by the imaging mechanism, wherein, in the imaging step, the light irradiation mechanism and the POF are disposed so that the ratio (D/W) of the shortest distance D to a light emission width W is in the range of 0.9 to 1.3 where W is the light emission width of the light irradiation mechanism and D is the shortest distance between a light emission position of the light irradiation mechanism and the side of the POF, and wherein, in the data processing step, a light intensity distribution on the side of the POF is acquired from the image data on the POF, and the core diameter of the POF is calculated based on the light intensity distribution.

[2] The method of measuring the core diameter of the POF according to [1], wherein, in the imaging step, the light irradiation and the imaging are performed on the POF from at least two directions to acquire image data on at least two sides of the POF which are different in orientation, and wherein, in the data processing step, the core diameter of the POF is calculated based on a light intensity distribution acquired from the at least two image data.

[3] The method of measuring the core diameter of the POF according to [1] or [2], wherein, in the data processing step, a cladding diameter as well as the core diameter of the POF is calculated based on a light intensity distribution in a radial direction of the POF which is acquired from the image data on the POF.

[4] The method of measuring the core diameter of the POF according to [3], wherein, in the data processing step, an eccentricity of the POF is calculated based on the calculated core diameter and cladding diameter of the POF.

[5] An apparatus for measuring a core diameter of a POF having a core and a cladding, comprising: a light irradiation mechanism for directing light toward one side of the POF; an imaging mechanism provided on the opposite side of the POF from the light irradiation mechanism and for imaging the opposite side of the POF from the side irradiated with light; and a data processing mechanism for processing image data on the POF acquired by the imaging mechanism, wherein the light irradiation mechanism is disposed so that the ratio (D/W) of the shortest distance D to a light emission width W is in the range of 0.9 to 1.3 where W is the light emission width of the light irradiation mechanism and D is the shortest distance between a light emission position of the light irradiation mechanism and the side of the POF, and wherein the data processing mechanism is set so as to acquire a light intensity distribution in a radial direction of the POF from the image data on the POF and to calculate the core diameter of the POF based on the light intensity distribution.

[6] The apparatus for measuring the core diameter of the POF according to [5], wherein the light irradiation by means of the light irradiation mechanism and the imaging by means of the imaging mechanism are performed on the POF from at least two directions to acquire image data on at least two sides of the POF which are different in orientation, and wherein the data processing mechanism is set so as to calculate the core diameter of the POF based on a light intensity distribution acquired from the at least two image data.

[7] The apparatus for measuring the core diameter of the POF according to [6], wherein at least two sets of imaging units each including the light irradiation mechanism and the imaging mechanism facing each other across the POF are arranged in different orientations with respect to the POF.

[8] The apparatus for measuring the core diameter of the POF according to [6], wherein a single imaging unit including the light irradiation mechanism and the imaging mechanism facing each other across the POF is provided, and the arrangement of the imaging unit relative to the POF is changeable.

[9] The apparatus for measuring the core diameter of the POF according to any one of [5] to [8], wherein the data processing mechanism is set so as to calculate a cladding diameter as well as the core diameter of the POF based on a light intensity distribution in a radial direction of the POF which is acquired from the image data on the POF.

[10] The apparatus for measuring the core diameter of the POF according to [9], wherein the data processing mechanism is set so as to calculate an eccentricity of the POF based on the calculated core diameter and cladding diameter of the POF.

[11] A method of detecting a defect in a POF, comprising: an imaging step in which there are provided a light irradiation mechanism for directing light toward one side of the POF and an imaging mechanism corresponding to the light irradiation mechanism and for imaging the opposite side of the POF from the side irradiated with light, the imaging step being the step of irradiating the side of the POF with light by means of the light irradiation mechanism and imaging the opposite side of the POF to acquire image data by means of the imaging mechanism corresponding to the light irradiation mechanism; and a data processing step of processing the image data acquired by the imaging mechanism, wherein, in the imaging step, the light irradiation mechanism and the POF are disposed so that the ratio (D/W) of the shortest distance D to a light emission width W is in the range of 0.9 to 1.3 where W is the light emission width of the light irradiation mechanism and D is the shortest distance between a light emission position of the light irradiation mechanism and the side of the POF, wherein, in the imaging step, the light irradiation and the imaging are performed on the POF from at least two directions to acquire image data on at least two sides of the POF which are different in orientation, and wherein, in the data processing step, at least two light intensity distributions on the side of the POF are acquired from the at least two image data, and a defect in the POF is detected based on the at least two light intensity distributions.

[12] An apparatus for detecting a defect in a POF, comprising: a light irradiation mechanism for directing light toward one side of the POF; an imaging mechanism corresponding to the light irradiation mechanism and for imaging the opposite side of the POF from the side irradiated with light; the light irradiation mechanism irradiating the side of the POF with light; the imaging mechanism corresponding to the light irradiation mechanism and imaging the opposite side of the POF to acquire image data; and a data processing mechanism for processing the image data acquired by the imaging mechanism, wherein the light irradiation mechanism is disposed so that the ratio (D/W) of the shortest distance D to a light emission width W is in the range of 0.9 to 1.3 where W is the light emission width of the light irradiation mechanism and D is the shortest distance between a light emission position of the light irradiation mechanism and the side of the POF, wherein the light irradiation and the imaging are performed on the POF from at least two directions to acquire image data on at least two sides of the POF which are different in orientation, and wherein the data processing mechanism is set so as to detect a defect in the POF based on a light intensity distribution acquired from the at least two image data.

[13] A method of detecting a defect in a POF, comprising: an imaging step in which there are provided at least three light irradiation mechanisms for directing light toward one side of the POF and at least three imaging mechanisms corresponding to the light irradiation mechanisms and for imaging the opposite side of the POF from the side irradiated with light, the imaging step being the step of irradiating the side of the POF with light by means of the light irradiation mechanisms and imaging the opposite side of the POF to acquire at least three image data by means of the imaging mechanisms corresponding to the light irradiation mechanisms; and a data processing step of processing the at least three image data acquired by the imaging mechanisms, wherein, in the imaging step, the light irradiation mechanisms and the POF are disposed so that the ratio (D/W) of the shortest distance D to a light emission width W is in the range of 0.9 to 1.3 where W is the light emission width of the light irradiation mechanisms and D is the shortest distance between a light emission position of the light irradiation mechanisms and the side of the POF, and wherein, in the data processing step, at least three light intensity distributions on the side of the POF are acquired from the at least three image data, and a defect in the POF is detected based on the at least three light intensity distributions.

[14] An apparatus for detecting a defect in a POF, comprising: at least three light irradiation mechanisms for directing light toward one side of the POF; at least three imaging mechanisms corresponding to the light irradiation mechanisms and for imaging the opposite side of the POF from the side irradiated with light; the light irradiation mechanisms irradiating the side of the POF with light; the imaging mechanisms corresponding to the light irradiation mechanisms and imaging the opposite side of the POF to acquire at least three image data; and a data processing mechanism for processing the at least three image data acquired by the imaging mechanisms, wherein the light irradiation mechanisms are disposed so that the ratio (D/W) of the shortest distance D to a light emission width W is in the range of 0.9 to 1.3 where W is the light emission width of the light irradiation mechanisms and D is the shortest distance between a light emission position of the light irradiation mechanisms and the side of the POF, and wherein the data processing mechanism is set so as to acquire at least three light intensity distributions on the side of the POF from the at least three image data and to detect a defect in the POF based on the at least three light intensity distributions.

To ensure the product standards of POFs which are expected to increase in production in the future, the present inventors have made studies with the objective of obtaining an apparatus capable of measuring the core diameter of POFs in an in-line fashion in the steps of manufacturing the POFs. The present inventors have come up with the idea of measuring the core diameter of a POF from a lateral direction of the POF because the core diameter cannot be continuously measured along the longitudinal direction of the POF if the core diameter is measured at an end surface of the POF. In the course of studies, it has turned out that, when light is directed toward one side of the POF and the opposite side of the POF from the side irradiated with light is imaged, the POF functions as a lens, so that the position of the interface between a core and a cladding is identified in image data on the POF from the light and dark states seen through the POF.

As a result of further studies, the present inventors have found that, when the ratio (D/W) of the shortest distance D to the light emission width W is in a predetermined range where W is the light emission width of the light irradiation mechanism and D is the shortest distance between the light irradiation mechanism and the POF, the position of the interface between the core and the cladding is accurately identified with high accuracy, so that the value of the core diameter is accurately determined and a defect in the POF is easily detected.

The method of measuring the core diameter of the POF according to the present disclosure as mentioned above is capable of measuring the core diameter of the POF easily and precisely only by providing the light irradiation mechanism and the imaging mechanism in a specific arrangement on the side of the POF extending in the longitudinal direction and acquiring image data on the opposite side while irradiating the side of the POF with light. This measuring method is capable of making continuous measurements while moving the POF in the longitudinal direction to allow an in-line measuring process, i.e. a quality inspection as to whether variations in core diameter are within specifications or not, to be performed in the course of the manufacturing steps of the POF. This achieves the stable supply of POFs of high quality.

The apparatus for measuring the core diameter of the POF according to the present disclosure is capable of calculating the core diameter of the POF easily and precisely only by providing the light irradiation mechanism and the imaging mechanism in a specific arrangement in the middle of the manufacturing line of the POF and processing image data acquired from the imaging mechanism by means of the specific data processing mechanism. Thus, the apparatus is capable of efficiently providing POFs of high quality without reducing the manufacturing speed of the POFs. Moreover, the installation of the core diameter measuring apparatus has the advantage of not requiring significant changes of facilities and provision of additional space.

The method of detecting the defect in the POF according to the present disclosure acquires image data from three directions which are different in orientation with respect to the POF. This eliminates circumferential blind spots to suppress the omission of detection of defects. Also, the method is capable of identifying layers containing defects to efficiently detect only defects causing transmission losses, whereby over-detection is suppressed.

The apparatus for detecting the defect in the POF according to the present disclosure is capable of easily detecting defects (foreign materials, bubbles, and the like) contained in the POF by simply providing the apparatus in the middle of the manufacturing line of the POF. Thus, the apparatus is capable of efficiently providing POFs of high quality without reducing the manufacturing speed of the POFs. Moreover, the installation of the defect detecting apparatus has the advantage of not requiring significant changes of facilities and provision of additional space.

BRIEF DESCRIPTION OF DRAWINGS

FIG. 10 is a graph showing measured values of a core eccentricity as Example 6 and actual measured values in a contrasting manner.

FIG. 11 a graph showing measured values of the core diameter as Example 7 and actual measured values in a contrasting manner.

DESCRIPTION OF EMBODIMENTS

Next, embodiments according to the present disclosure will now be described in detail. It should be noted that the present disclosure is not limited to the embodiments.

A method of measuring a core diameter of a POF (hereinafter referred to simply as a "core diameter measuring method" in some cases) according to one embodiment of the present disclosure includes: an imaging step in which there are provided a light irradiation mechanism for directing light toward one side of the POF and an imaging mechanism for imaging the opposite side of the POF from the side irradiated with light, the imaging step being the step of irradiating the side of the POF with light by means of the light irradiation mechanism and imaging the opposite side of the POF to acquire image data by means of the imaging mechanism;

and a data processing step of processing the image data on the POF acquired by the imaging mechanism. In the imaging step, the POF is disposed so that the ratio (D/W) of the shortest distance D to a light emission width W is in the range of 0.9 to 1.3 where W is the light emission width of the light irradiation mechanism and D is the shortest distance between a light emission position of the light irradiation mechanism and the side of the POF. In the data processing step, a light intensity distribution on the side of the POF is acquired from the image data on the POF, and the core diameter of the POF is calculated based on the light intensity distribution.

Figure 1:
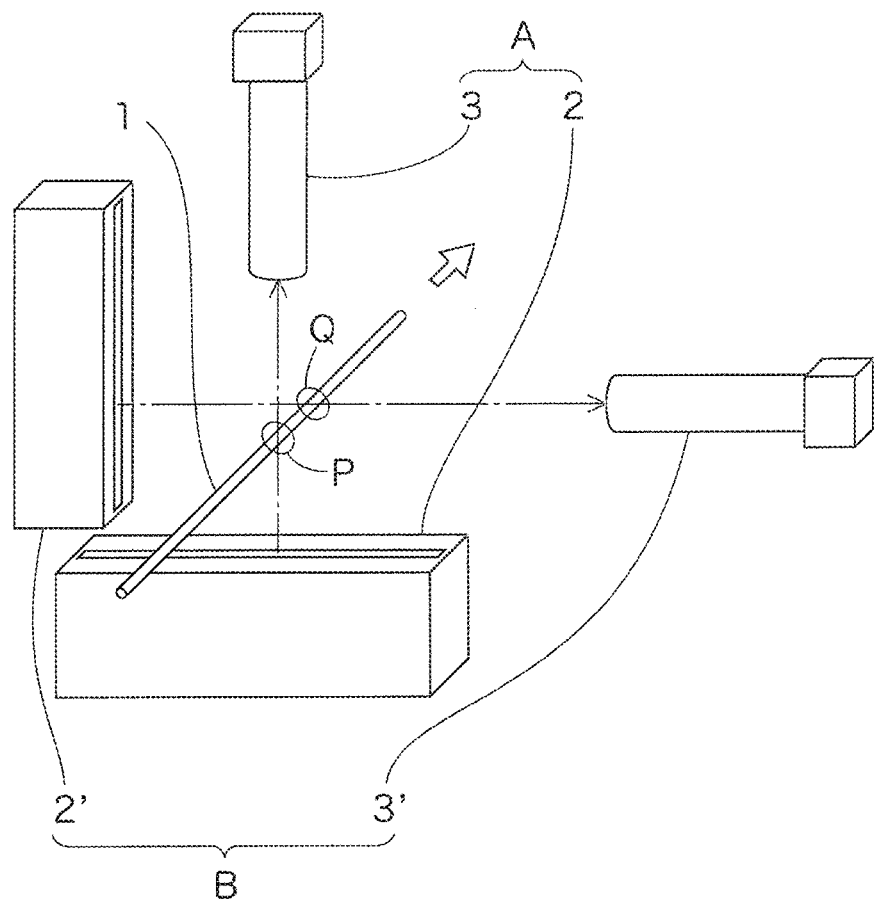
FIG. 1 is a schematic view showing an example of an apparatus according to the present disclosure.
Figure 2A:
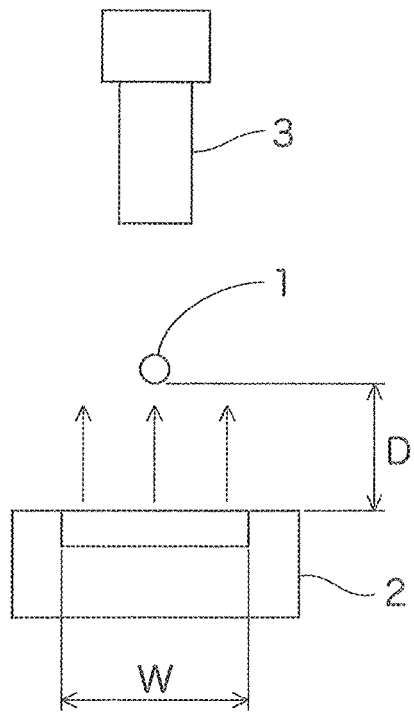
FIG. 2A is a schematic view illustrating principal parts of the aforementioned apparatus from a front direction (cross-sectional direction) of a POF.
Figure 2B:
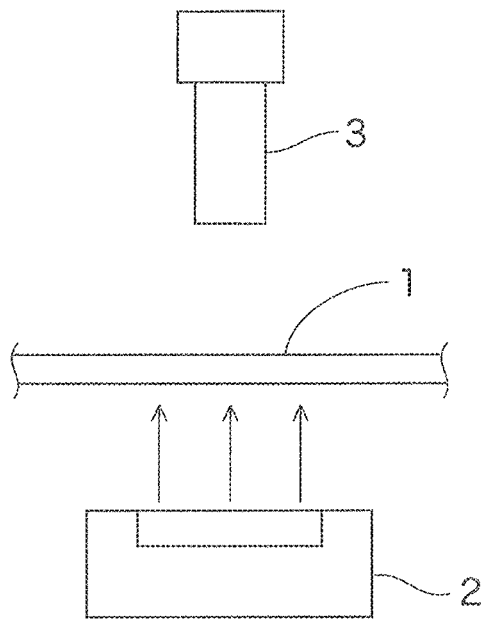
FIG. 2B is a schematic view illustrating the same principal parts from a lateral direction of the POF.

An example of an apparatus for carrying out the core diameter measuring method according to one embodiment of the present disclosure is schematically shown in FIG. 1. This apparatus is an apparatus for measuring the core diameter of a POF 1 moving as indicated by a thick arrow in FIG. 1. The apparatus includes a first light irradiation mechanism 2 for directing light in a vertical direction toward the side of the POF 1, and a first imaging mechanism 3 provided on the opposite side of the POF 1 from the light irradiation mechanism 2 and for imaging the opposite side of the POF 1 from the side irradiated with light. As schematically shown in FIG. 2A and FIG. 2B that is a right side view of FIG. 2A, this first light irradiation mechanism 2 and the first imaging mechanism 3 are arranged to face each other across the POF 1. Both of the first light irradiation mechanism 2 and the first imaging mechanism 3 constitute one set of imaging unit A.

An imaging unit B including a second light irradiation mechanism 2' and a second imaging mechanism 3' is provided in an orientation at a 90° angle around the POF 1 with respect to the imaging unit A (referring again to FIG. 1), i.e., in an arrangement such as to direct light in a horizontal direction.

A position P in which the imaging unit A intersects the POF 1 and a position Q in which the imaging unit B intersects the POF 1 are displaced a predetermined distance away from each other in a longitudinal direction of the POF 1. This distance is set in consideration of the distance traveled by the POF 1, and is preset so that first image data imaged by the imaging unit A at the position P and second image data imaged by the imaging unit B at the position Q are image data on two sides of the same position of the POF 1 which are spaced 90° apart from each other.

Figure 3:
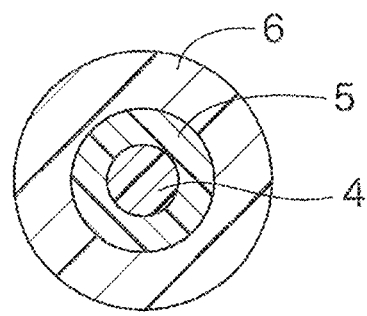
FIG. 3 is a schematic sectional view showing the configuration of the POF.

As shown in FIG. 3, the POF 1 to be measured by this apparatus includes a core 4 made of an organic compound with a polymer used as a matrix, a cladding 5 made of an organic compound having a different refractive index from that of the core 4, and an over cladding 6 provided outside the cladding 5 and for covering the cladding 5. In general, the core 4 is designed to have a refractive index higher than that of the cladding 5, and is capable of almost totally reflecting light. This allows the POF 1 to propagate light, with the light confined within the core 4. The over cladding 6 is provided in this example, but need not be provided when there is no need to protect the core 4 and the cladding 5, such as when the cladding 5 is very hard.

For example, various light sources such as light emitting diodes (LEDs), lasers, and halogen lamps may be used as the first and second light irradiation mechanisms 2 and 2' for irradiating the POF 1 with light. In particular, light sources that emit near-single-wavelength light, rather than white light such as light having a mixture of multiple wavelengths, are preferable from the viewpoint of preventing degradation of images and detection accuracy due to refractive index wavelength dispersion. Examples of single-wavelength light used herein include visible light of blue, green, and red. It is however preferable to use a wavelength less susceptible to the wavelength dispersion of the material of the POF 1 to be imaged. When polycarbonate (PC) or polymethyl methacrylate (PMMA) is used as the material of the POF 1, the refractive index wavelength dispersion converges toward longer wavelengths, so that the influence of long wavelength dispersion is reduced. It is hence preferable to use a light source with a red wavelength. Both collimated light and diffused light may be used as light exiting a light source. It is however preferable to use diffused light because the diffused light can enter the POF 1 from various angles.

It is important to arrange the first and second light irradiation mechanisms 2 and 2' so that the ratio (D/W) of the shortest distance D to a light emission width W is in the range of 0.9 to 1.3 where W is the light emission width of the first and second light irradiation mechanisms 2 and 2' and D is the shortest distance between a light emission position of the first and second light irradiation mechanisms 2 and 2' and the side of the POF 1 (with reference to FIG. 2A).

Specifically, in this apparatus, when light is directed toward one side of the POF 1 and the opposite side of the POF 1 from the side irradiated with light is imaged, the POF 1 functions as a lens, so that differences in refractive index between layers of the core 4, the cladding 5, and the over cladding 6 that constitute the POF 1 cause variations of light and shade at the respective interfaces to appear in displaced positions. This allows the identification of the positions of the interface between the core 4 and the cladding 5 of the POF 1 and the interface between the cladding 5 and the over cladding 6. The apparatus is characterized by analyzing image data, based on the aforementioned principle.

The amount of light impinging on the POF 1 and the way the light impinges on the POF 1 are important for accurate analysis of the image data through the use of the variations of light and shade. To this end, it is necessary that the ratio (D/W) of the shortest distance D to the light emission width W is in the range of 0.9 to 1.3 as mentioned above. In particular, this ratio is preferably in the range of 1.0 to 1.25, and more preferably in the range of 1.1 to 1.15.

Figure 4A:
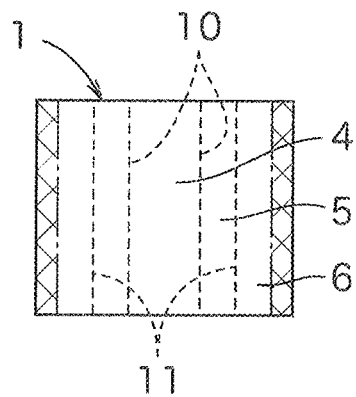
FIGS. 4A to 4C are views illustrating image data from the aforementioned apparatus.

If the ratio D/W is less than 0.9, a light emitting portion is too close in relation to the amount of light. In this case, the resulting image data, as schematically shown in FIG. 4A for example, shows that the entire POF 1 glows white and only a region around the over cladding 6 is dark and shaded. As a result, lines 10 (broken lines in the figure) indicating the interface between the core 4 and the cladding 5 and lines 11 (broken lines in the figure) indicating the interface between the cladding 5 and the over cladding 6, which should be visible, cannot be seen.

Figure 4B:
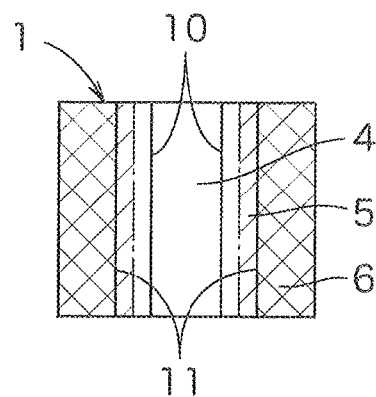

On the other hand, if the ratio D/W is in the proper range, the resulting image data, as schematically shown in FIG. 4B for example, shows that the variations of light and shade appear in displaced positions in accordance with the refractive indices of the respective layers. As a result, the lines 10 indicating the interface between the core 4 and the cladding 5 and the lines 11 indicating the interface between the cladding 5 and the over cladding 6 are clearly visible as lines.

Figure 4C:
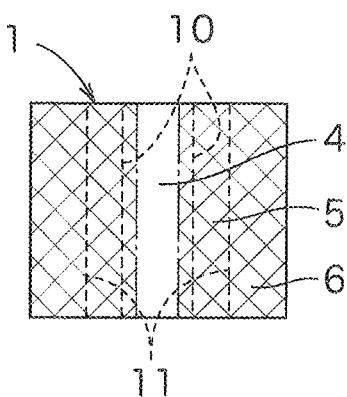

If the ratio D/W is greater than 1.3, the light emitting portion is too far away in relation to the amount of light. In this case, the resulting image data, as schematically shown in FIG. 4C for example, shows too many dark areas. As a result, the lines 10 and 11 (broken lines in the figure) indicating the interfaces cannot be recognized.

The light emission width W of the first light irradiation mechanism 2 refers to the greatest width of a light emitting surface (or the greatest diameter when the light emitting surface is circular as seen in plan view) in an arrangement such that the imaging surface of the first imaging mechanism 3 and the light emitting surface of the first light irradiation mechanism 2 are parallel to each other when the first light irradiation mechanism 2 is placed to face the first imaging mechanism 3 across the POF 1. The same is true for the light emission width W of the second light irradiation mechanism 2'.

A line sensor camera or an area sensor camera, for example, which uses a lens to form an image of an object on an element surface and converts the amount of light into a signal to output the signal may be preferably used as the first imaging mechanism 3 for imaging the side of the POF 1 irradiated with light. In particular, the area sensor camera is more preferably used in terms of its ability to reduce the influence of shaking of a moving subject by increasing a shutter speed. The same is true for the second imaging mechanism 3'.

The first imaging mechanism 3 is positioned to face the first light irradiation mechanism 2 across the POF 1. The first light irradiation mechanism 2 and the first imaging mechanism 3 are preferably arranged so that the centers thereof are positioned on the same axis across the POF 1. However, the centers of the first light irradiation mechanism 2 and the first imaging mechanism 3 need not necessarily be positioned on the same axis to the extent that a data processing mechanism to be described later is able to correct image data processing. The same is true for the second imaging mechanism 3'.

In the aforementioned apparatus, image data on two sides of the POF 1 which are spaced 90° apart from each other are acquired by two imaging units: the imaging unit A including the first light irradiation mechanism 2 and the first imaging mechanism 3 and the imaging unit B including the second light irradiation mechanism 2' and the second imaging mechanism 3'. The acquired image data are sent to the data processing mechanism (not shown in FIG. 1) incorporating an arithmetic processing circuit and the like for measuring the core diameter, and are processed therein.

The two imaging units, i.e., the imaging unit A including the first light irradiation mechanism 2 and the first imaging mechanism 3 and the imaging unit B including the second light irradiation mechanism 2' and the second imaging mechanism 3', are preferably disposed on the same plane crossing the POF 1 in the longitudinal direction. When the two imaging units are disposed on the aforementioned same plane, each of the imaging units is capable of acquiring images of the POF 1 on a plane parallel to the radial direction of the POF 1. This allows the calculation of the core diameter of the POF 1 with high accuracy even when the POF 1 is not stable during movement.

When the two imaging units are disposed on the aforementioned same plane, there are cases in which interference of light emitted from the light irradiating mechanisms of the respective imaging units occurs to preclude accurate calculation and detection. However, the accurate calculation and detection are preferably maintained, for example, by making the wavelengths of the light emitted from the light irradiating mechanisms of the respective imaging units different from each other and placing a band-pass filter capable of transmitting only a specific wavelength band in front of each of the imaging mechanisms.

The data processing mechanism may be based on any type of image analysis software or completely purpose-built software, but is designed to acquire light intensity distributions of image data sent from the first imaging mechanism 3 and the second imaging mechanism 3', to analyze the states of the distributions, and to apply the distribution states to a predetermined arithmetic expression, thereby calculating an intended core diameter. If there is a misalignment between the two image data obtained at different angles 90° apart from each other because the POF 1 itself is inclined or the core 4 is eccentric in the POF 1, the data processing mechanism performs a further correction process in accordance with the misalignment.

Figure 5:
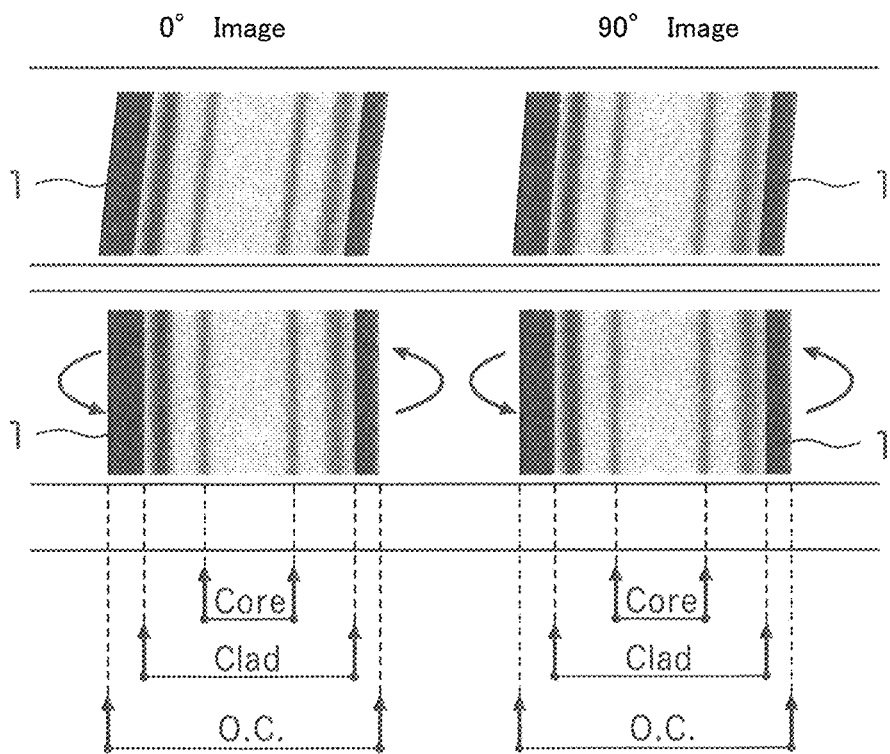
FIG. 5 is a view illustrating a correction process using two images obtained from two directions.

As shown in FIG. 5 for example, when two image data (0° image and 90° image) are imaged at different inclinations, an image rotation process is performed to rotate both of the image data (0° image and 90° image) circumferentially through respective predetermined angles, thereby remodifying the two images as images inclined as little as possible.

Figure 6:
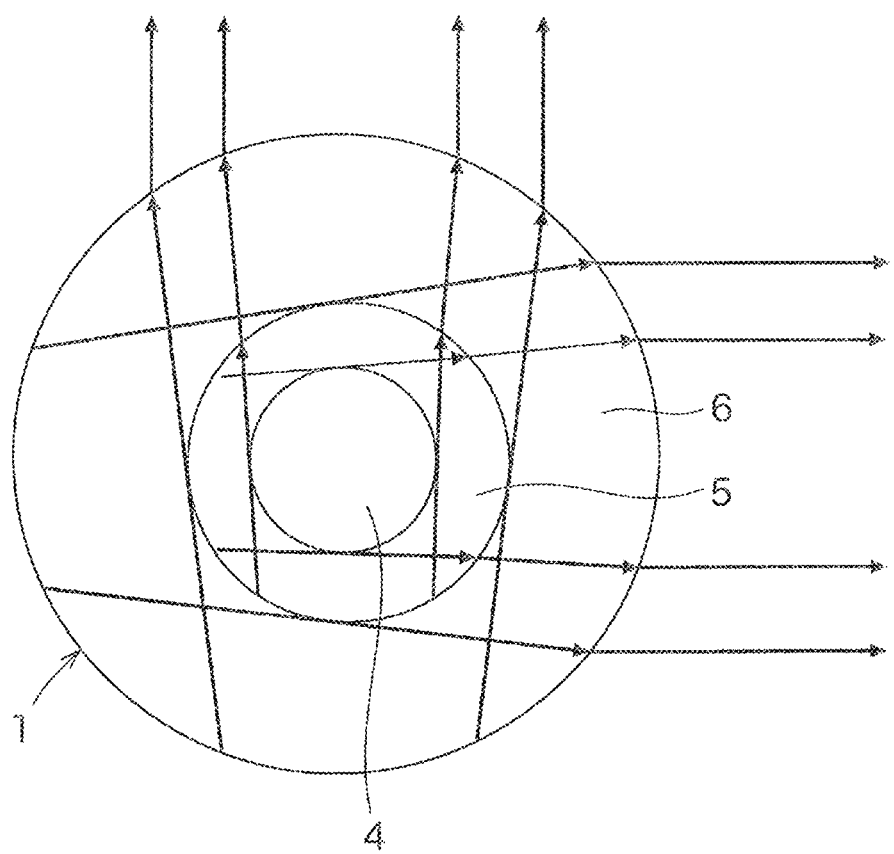
FIG. 6 is a view illustrating the correction process using the two images obtained from the two directions.

In addition, as shown in FIG. 6 for example, the diameters and center positions of the respective layers are determined from the position of the interface between the core 4 and the cladding 5 and the position of the interface between the cladding 5 and the over cladding 6 which are obtained from the two image data. Then, the eccentricity of the core 4 is calculated from the deviation of the center positions of the respective layers, and the core diameter is modified. Thus, the core diameter is determined with higher accuracy.

In this manner, the aforementioned apparatus is capable of calculating the core diameter of the POF 1 easily and accurately only by providing the first light irradiation mechanism 2 and the first imaging mechanism 3 in a specific arrangement with respect to the POF 1 extending in the longitudinal direction and then processing the image data obtained from the imaging mechanism 3 by means of the specific data processing mechanism.

The image data is acquired from a lateral direction of the POF 1. This allows the apparatus to be incorporated in-line in the middle or at the end of the manufacturing line of the POF 1 and to measure the core diameter while the POF 1 is moved intermittently. In particular, when the first imaging mechanism 3 capable of imaging the object even when the object is moving is used, the core diameter of the POF 1 is efficiently measured especially without reducing the manufacturing speed of the POF 1, which is preferable. Moreover, the installation of the aforementioned apparatus has the advantage of not requiring significant changes of facilities and provision of additional space.

The aforementioned apparatus includes the two imaging units A and B for the POF 1 to acquire image data from two different circumferential directions. The apparatus is hence capable of modifying the misalignment of the core 4, the inclination of the POF 1 itself, and the like to measure the core diameter with high accuracy. This provides the POF 1 of higher quality as compared with the core diameter measurement based on image data obtained from one direction. Three or more sets of imaging units different in orientation may be used to further improve the measurement accuracy.

The use of three or more sets of imaging units different in orientation not only improves the measurement accuracy of the core diameter of the moving POF but also allows the identification of layers having defects. For example, foreign materials or bubbles, if any, in the core layer cause an increase in transmission losses of light. On the other hands, foreign materials or the like, if any, in other than the core layer, e.g., in the cladding layer do not affect the light transmission losses. Thus, the foreign materials or the like causing the transmission losses are efficiently identified by identifying the core layer and then detecting the foreign materials, whereby over-detection is suppressed.

Figure 7:
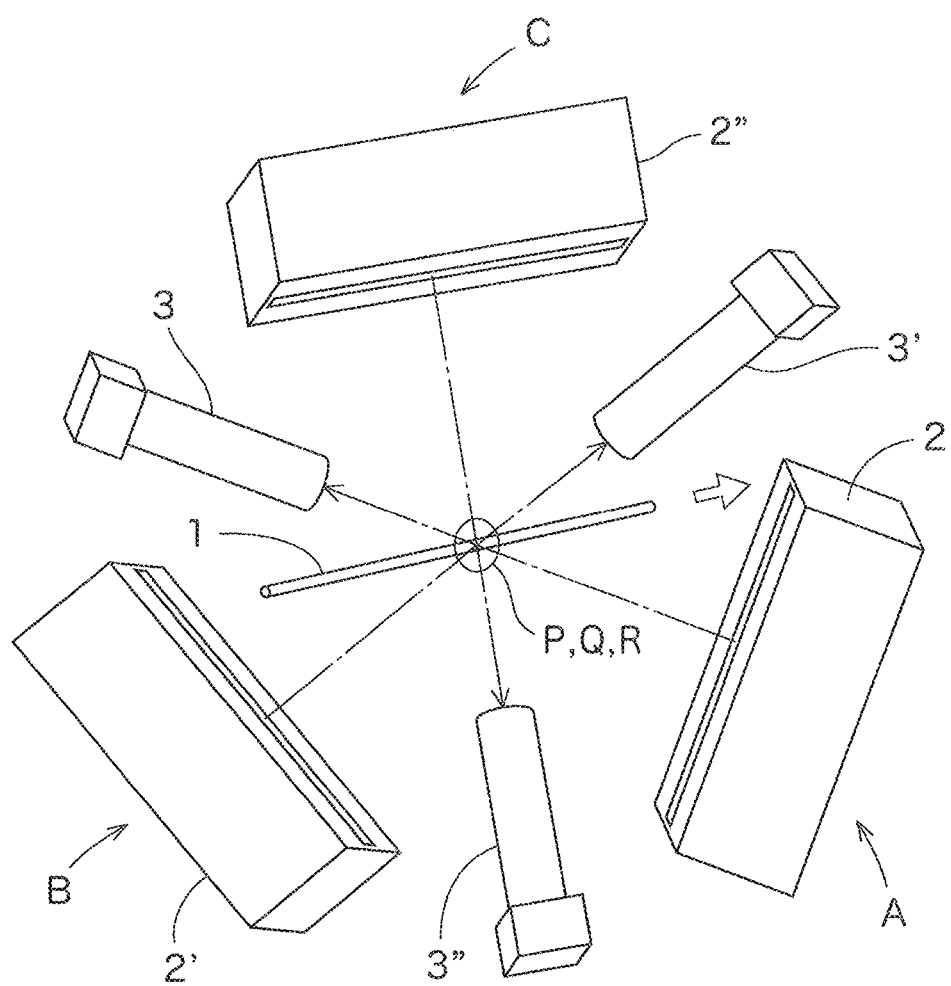
FIG. 7 is a schematic view showing a modification of the aforementioned apparatus.

Specifically, as shown in FIG. 7, three sets of imaging units A, B, and C different in orientation are used. The three sets of imaging units A, B, and C are spaced equally, i.e. at 120° intervals, in the circumferential direction of the POF 1, and disposed on the same plane crossing the longitudinal direction of the POF 1. This provides image data obtained from three directions spaced 120° apart from each other in the circumferential direction. The detection of defects using the image data obtained from the three directions spaced 120° apart from each other in the circumferential direction eliminates circumferential blind spots to suppress the omission of detection of defects. In FIG. 7. the reference character R designates a position at which the imaging unit C intersects the POF 1; 2" designates a third light irradiation mechanism included in the imaging unit C; and 3" designates a third imaging mechanism included in the imaging unit C. Although the three sets of imaging units A, B, and C different in orientation are illustrated in FIG. 7, four or more sets of imaging units different in orientation may be of course used. Alternatively, a single imaging unit may image the POF 1 in different positions equally spaced in the circumferential direction of the POF 1 to acquire image data obtained from different directions and showing the POF 1 in different orientations in the circumferential direction.

Of course, when the POF 1 to be measured includes the core 4 very high in circularity or when the POF 1 with improved linearity is measured, the plurality of imaging units need not necessarily be provided, but a single imaging unit may be used.

Figure 8:
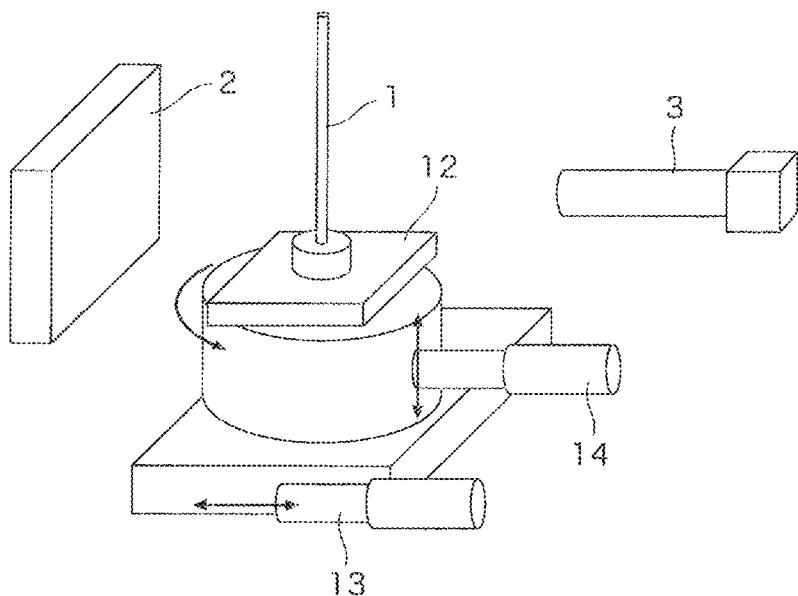
FIG. 8 is a schematic view showing another example of the apparatus of the present disclosure.

To acquire two or more image data different in the circumferential direction, a single imaging unit may be set so that the position thereof is changeable relative to the POF 1, rather than the plurality of imaging units positioned in different orientations around the POF 1, as in the aforementioned apparatus. An example of the single imaging unit is schematically shown in FIG. 8.

This apparatus includes a holding mechanism 12 for holding the POF 1 so that the POF 1 intersects the single imaging unit including the first light irradiation mechanism 2 and the first imaging mechanism 3. The apparatus is designed to rotate the holding mechanism 12 in the circumferential direction together with the POF 1 held by the holding mechanism 12, thereby acquiring image data on at least two sides of the POF 1 which are different in orientation. The reference numeral 13 designates an adjustment mechanism for fine adjustment of a distance between the POF 1 and the first light irradiation mechanism 2, and 14 designates an adjustment mechanism for fine adjustment of the measurement position of the POF 1 in a vertical direction.

This apparatus is capable of acquiring a plurality of image data by changing the circumferential orientation of the POF 1 without providing the plurality of imaging units as in the apparatus shown in FIG. 1 to achieve the measurement of the core diameter and the detection of foreign materials and bubbles with high accuracy. However, this apparatus is not capable of measurement and detection while the POF 1 is moving, so that the application purpose of this apparatus is limited to the inspection of prototypes and finished products, and the like.

Contrary to the aforementioned apparatus, an annular base rotatable in the circumferential direction may be provided around the moving POF 1, and the first light irradiation mechanism 2 and the first imaging mechanism 3 may be mounted to the annular base in diagonally opposite relation. By rotating the annular base, image data on at least two sides of the POF 1 which are different in orientation are acquired. In this case, the imaging from different directions is preferably performed in timed relation to the stop of the POF 1.

As mentioned earlier, when the core diameter is calculated based on the image data imaged from at least two directions, not only the core diameter but also the diameters of the cladding 5 and the over cladding 6 are calculated for the correction process, and the outer diameters and center positions of the respective layers are determined. Using these values, the eccentricity of the core 4 and the circularity of the outer diameter of the POF 1 itself, for example, may be determined.

In particular, if the eccentricity of the core 4 is significantly out of specification, there is a danger that the transmission losses of light increase. For this reason, the measurement of the eccentricity of the core 4 in addition is in line with practical needs.

EXAMPLES

The present disclosure will be described hereinafter in further detail using examples and comparative examples. The present disclosure is not limited to the examples to be described below within the scope of the present disclosure.

Examples 1 to 5 and Comparative Examples 1 to 3

First, in the apparatus shown in FIG. 1, the light emission width W of the first light irradiation mechanism 2 of the imaging unit A and the shortest distance D between the light irradiation mechanism 2 and the POF 1 were set as listed in TABLE 1 below, whereby core diameter measuring apparatuses of Examples 1 to 5 and Comparative Examples 1 to 3 were produced. An LED (wavelength of 630 nm typ.; diffused light; available from CCS Inc.) was used as the light irradiation mechanism 2, and the amount of light was adjusted and used so that the amount of light received by a camera just outside the POF 1 (surface of the POF 1) was not less than 128/256 levels of gradation. The same settings are used for the imaging unit B as for the imaging unit A.

Then, these apparatuses were used to measure the ability to identify the positions of the interface between the core and the cladding of the POF 1 and the interface between the cladding and the over cladding, based on light intensity distributions of image data. As a result of the measurements, each apparatus that was able to identify the positions was indicated by an open circle "o", and each apparatus that was not able to identify the positions was indicated by a cross "x". These results were listed in TABLE 1 below.

The POF 1 has a core diameter of 120 μm. Both the core and the cladding are made of a resin containing methyl methacrylate (MMA) as a main component. The core has a refractive index increased by a refractive index adjusting agent. The over cladding is made of polycarbonate (PC) resin. Also, the expression "main component" means a component that influences the properties of the material, and the content of the component is generally not less than 50% by mass of the whole material.

Then, the apparatuses were evaluated based on the aforementioned measurement results, and the results were listed in TABLE 1 below in addition. A method of evaluation is as follows.

Evaluation oo: Both the interface between the core and the cladding and the interface between the cladding and the over cladding were easily identified.

o: Both the interface between the core and the cladding and the interface between the cladding and the over cladding were identified.

x: Either the interface between the core and the cladding or the interface between the cladding and the over cladding was not identified.

TABLE 1

|  | Comp. Ex. 1 | Comp. Ex. 2 | Ex. 1 | Ex. 2 | Ex. 3 | Ex. 4 | Ex. 5 | Comp. Ex. 3 |
|---|---|---|---|---|---|---|---|---|
| Light emission width W (mm) | 100 | 100 | 100 | 100 | 60 | 50 | 100 | 100 |
| Shortest distance D (mm) | 60 | 80 | 90 | 110 | 70 | 60 | 130 | 140 |
| D/W | 0.6 | 0.8 | 0.9 | 1.1 | 1.17 | 1.2 | 1.3 | 1.4 |
| Core-cladding interface | ○ | ○ | ○ | ○ | ○ | ○ | ○ | x |
| Cladding-overcladding interface | x | x | ○ | ○ | ○ | ○ | ○ | ○ |
| Evaluation | x | x | ○ | ○○ | ○○ | ○○ | ○ | x |

The aforementioned results show that the core diameter is easily measured in the apparatuses in which the ratio (D/W) of the shortest distance D to the light emission width W is in the range of 0.9 to 1.3.

Example 6

Figure 9:
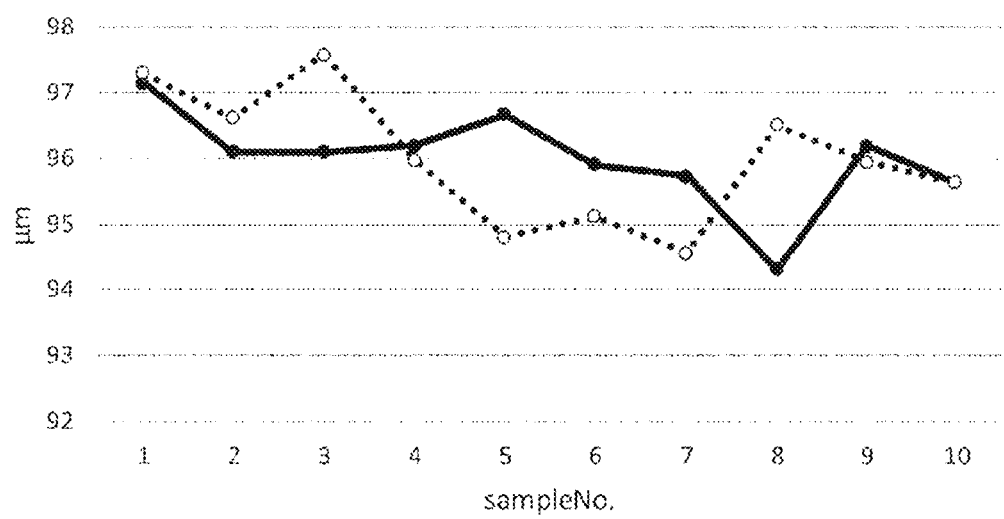
FIG. 9 is a graph showing measured values of a core diameter as Example 6 and actual measured values in a contrasting manner.

Next, the apparatus shown in FIG. 7 was used to measure the diameter and eccentricity of the core (with reference to FIG. 3) of the POF 1 in an in-line fashion ten times at different measurement locations. The apparatus of FIG. 7 is similar in configuration (the light emission width and the like) to that in Example 2 except that the imaging unit C is added. The same POF 1 to be measured is used as in Example 2. Results of comparison between the obtained diameter and eccentricity of the core 4 and the actually measured diameter and eccentricity of the core 4 are shown in FIGS. 9 and 10.

As a result of the comparison, the maximum difference in diameter of the core 4 was 2.2 μm, and the maximum difference in eccentricity of the core 4 was 1.6 μm.

The actually measured diameter and eccentricity of the core 4 were determined in the following manner. Specifically, an area of the POF 1 where the diameter and eccentricity of the core 4 were measured is actually cut and polished. The polished surface is magnified and observed under a microscope, whereby a microscopic cross-sectional image is acquired. The diameter and eccentricity of the core 4 of the POF 1 were identified from this microscopic cross-sectional image, and these values were used as the actual diameter and eccentricity of the core 4.

Example 7

Figure 12:
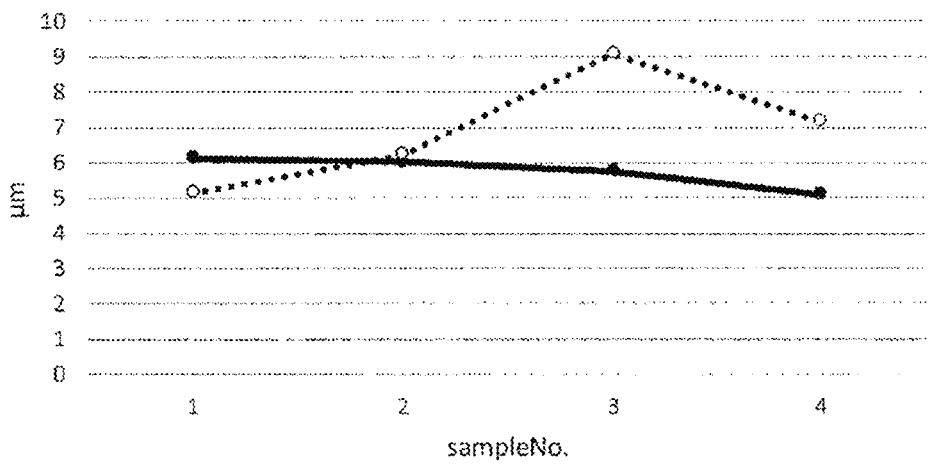
FIG. 12 is a graph showing measured values of the core eccentricity as Example 7 and actual measured values in a contrasting manner.

The apparatus shown in FIG. 1 was used to measure the diameter and eccentricity of the core 4 (with reference to FIG. 3) of the POF 1 in the same manner as in Example 6 except that the measurement was made at four locations. Results of comparison between the obtained diameter and eccentricity of the core 4 and the actually measured diameter and eccentricity of the core 4 are shown in FIGS. 11 and 12.

As a result of the comparison, the maximum difference in diameter of the core 4 was 2.9 μm, and the maximum difference in eccentricity of the core 4 was 3.3 μm.

Example 8

The apparatus shown in FIG. 7 was used to detect defects contained in the entire POF 1 without identifying layers in the 6.5-m POF 1 in accordance with a defect detection method to be described below. The results are listed in TABLE 2 below. The results in TABLE 2 show that, when defects are detected without identifying layers, defects in the core 4 (with reference to FIG. 3) are also detected, but foreign materials in the over cladding 6 irrelevant to the transmission losses are detected in excessive amounts.

TABLE 2

| Defects | | Number of detected defects | Percentage (%) with respect to total number of detected defects |
|---|---|---|---|
| Layer | Type | | |
| Core 4 | Foreign materials | 2 | 0.3 |
|  | Bubbles | 0 | 0 |
| Over cladding 6 | Foreign materials | 595 | 99.7 |
| total | | 597 | 100 |

Example 9

Further, the apparatus shown in FIG. 7 was used to detect defects contained in the entire POF 1, with the core 4 (with reference to FIG. 3) identified in the 24-m POF 1, in accordance with the defect detection method to be described below. The results are listed in TABLE 3 below. The results in TABLE 3 show that, when defects were detected with the core 4 identified, the detection of foreign materials in the over cladding 6 irrelevant to the transmission losses in excessive amounts was suppressed, and defects in the core 4 were detected efficiently.

TABLE 3

| Defects | | Number of detected defects | Percentage (%) with respect to total number of detected defects |
|---|---|---|---|
| Layer | Type | | |
| Core 4 | Foreign materials | 4 | 28.6 |
|  | Bubbles | 5 | 35.7 |
| Over cladding 6 | Foreign materials | 5 | 35.7 |
| total | | 14 | 100 |

<Defect Detection Method>

First, the imaging units A, B, and C are used in the apparatus shown in FIG. 7 to acquire different image data on the POF 1 from three directions spaced 120° apart from each other in the circumferential direction.

Figure 13:
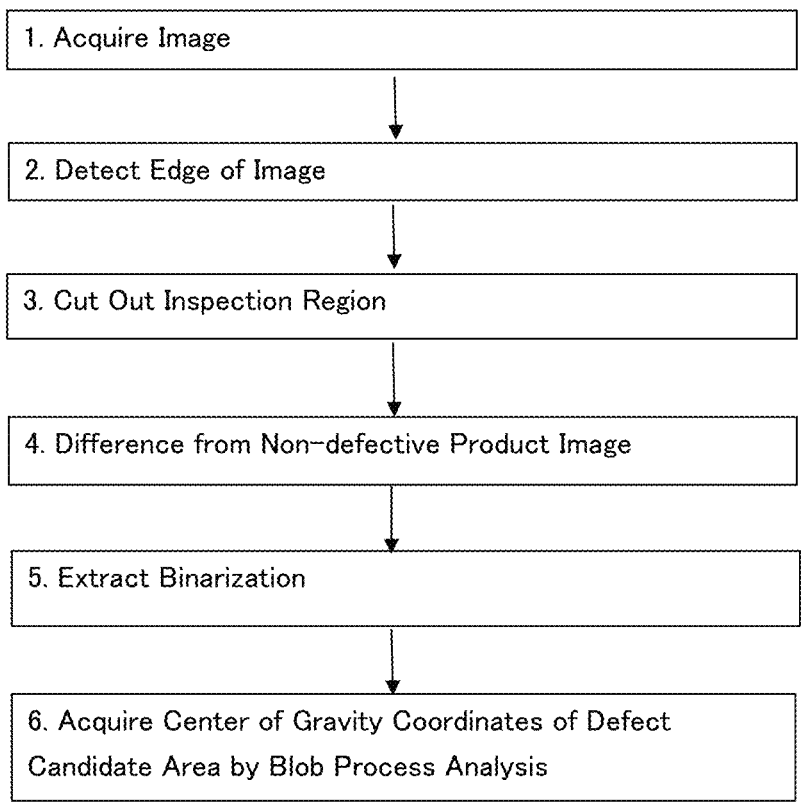
FIG. 13 is a flow diagram illustrating a procedure (I) for a defect detecting method.

The center of gravity coordinates of detected candidate objects are acquired from each of the acquired image data as illustrated in FIG. 13 and a procedure (I) below. In a binarization process of the procedure (I), a threshold value is set at 10, and areas with a difference of 10 levels of gradation from normal portions out of the 256 levels of gradation of 8-bit image data are extracted as the detected candidate objects.

Figure 14:
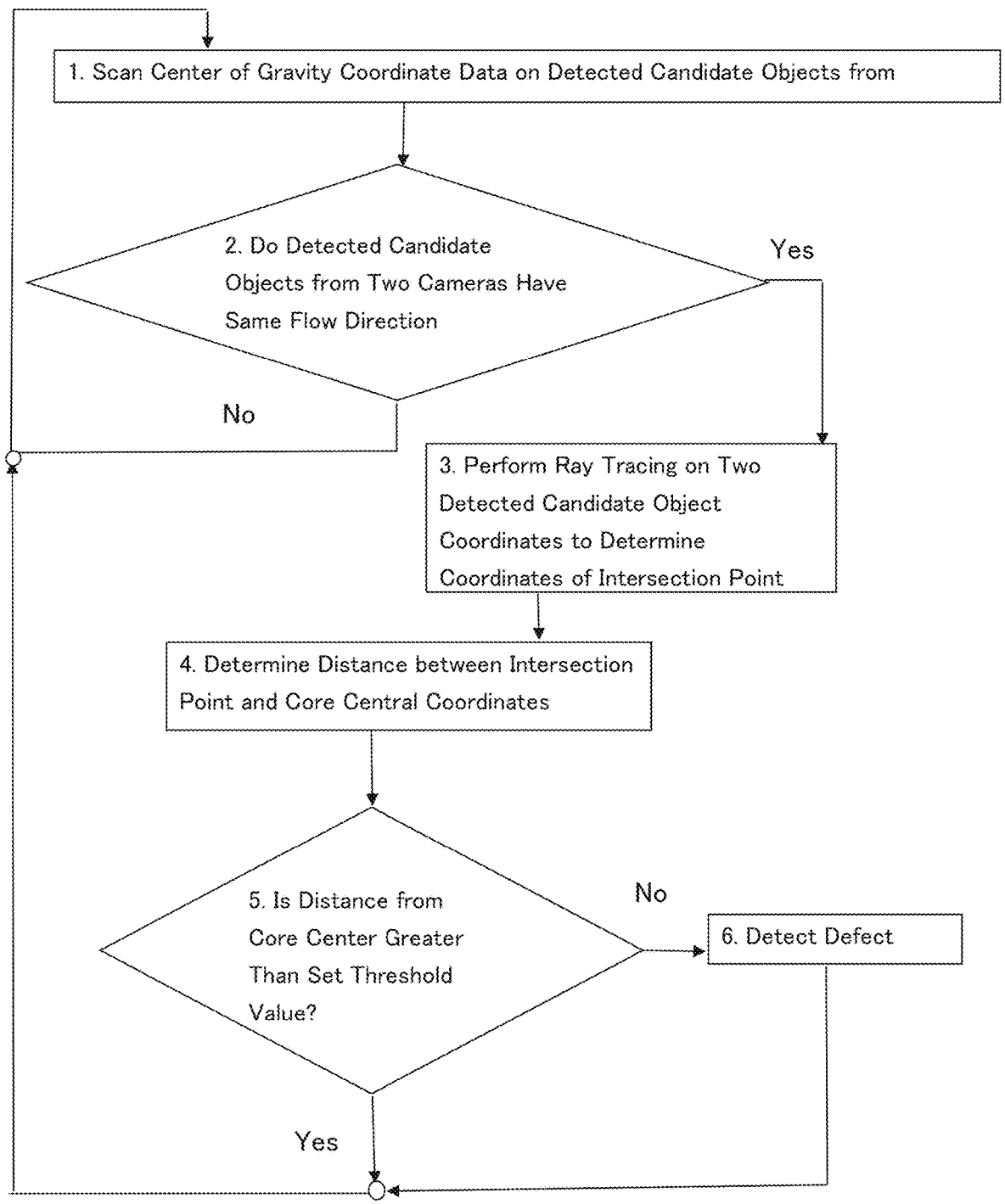
FIG. 14 is a flow diagram illustrating a procedure (II) for the defect detecting method.

Next, the obtained detected candidate objects are processed in accordance with FIG. 14 and a procedure (II) below, whereby faults (defects) in the POF 1 are detected.

<Procedure (I)>

1. Acquiring different image data using the imaging units A, B, and C to store the different image data in a memory.
2. Performing an edge detection process on the image data to obtain coordinates of the POF 1 in the image.
3. Using the obtained coordinates of the POF 1 and set values to cut out an image of a portion corresponding to the POF 1.
4. Comparing the cut-out image of the POF 1 with a previously stored non-defective product image to identify a difference therebetween as an abnormal portion.
5. Performing a binarization process on the image of the abnormal portion as compared with a set threshold value.
6. Performing a blob analysis on the binary image of the abnormal portion to obtain the center of gravity coordinates of the abnormal portion, thereby extracting a detected candidate object.

<Procedure (II)>

1. Preparing coordinate data on detected candidate objects in the imaging units in ascending order of flow direction coordinates of the POF 1 among the coordinate data on the detected candidate objects extracted by the procedure (I).
2. Extracting flow direction coordinates of the POF 1 whose difference is not more than the set threshold value from among the prepared coordinate data.
3. Using two flow direction coordinates of an extracted detected candidate object to perform ray tracing from two fields of view, thereby determining the coordinates of an intersection point in the cross section of the POF 1.
4. Calculating a distance between the intersection point and the central coordinates of the core 4.
5. Evaluating whether the distance is greater than the set threshold value or not.
6. Detecting a fault with the distance not greater than the threshold value.

Although specific forms in the present disclosure have been described in the aforementioned examples, the aforementioned examples should be considered as merely illustrative and not restrictive. It is contemplated that various modifications evident to those skilled in the art could be made without departing from the scope of the present disclosure.

The core diameter measuring method and core diameter measuring apparatus for the POF according to the present disclosure are useful in measuring the core diameter of the POF in an in-line fashion.

REFERENCE SIGNS LIST

1 POF
2 First light irradiation mechanism
2' Second light irradiation mechanism
3 First imaging mechanism
3' Second imaging mechanism

The invention claimed is:

1. A method of measuring a core diameter of a plastic optical fiber, comprising:
an imaging step comprising irradiating a side of the plastic optical fiber with a light irradiation source directing light toward the side of the plastic optical fiber and imaging an opposite side of the plastic optical fiber from the irradiated side with an imaging sensor; and
a data processing step of processing image data on the plastic optical fiber obtained by the imaging sensor,
wherein, in the imaging step, the light irradiation source and the plastic optical fiber are disposed so that a ratio (D/W) of a shortest distance D to a light emission width W is in a range of 0.9 to 1.3 where W is the light emission width of the light irradiation source and D is the shortest distance between a light emission position of the light irradiation source and the irradiated side of the plastic optical fiber, and
wherein, in the data processing step, a light intensity distribution on the side of the plastic optical fiber is obtained from the image data on the plastic optical fiber, and the core diameter of the plastic optical fiber is calculated based on the light intensity distribution.

2. The method of measuring the core diameter of the plastic optical fiber according to claim 1, further comprising:
in the imaging step, performing the light irradiation and the imaging on the plastic optical fiber from at least two directions obtaining image data on at least two sides of the plastic optical fiber which are different in orientation, and
in the data processing step, calculating the core diameter of the plastic optical fiber based on a light intensity distribution acquired from the at least two image data.

3. The method of measuring the core diameter of the plastic optical fiber according to claim 1, further comprising:
in the data processing step, calculating a cladding diameter as well as the core diameter of the plastic optical fiber based on a light intensity distribution in a radial direction of the plastic optical fiber which is obtained from the image data on the plastic optical fiber.

4. The method of measuring the core diameter of the plastic optical fiber according to claim 3, further comprising:
in the data processing step, calculating an eccentricity of the plastic optical fiber based on the calculated core diameter and cladding diameter of the plastic optical fiber.

5. An apparatus for measuring a core diameter of a plastic optical fiber having a core and a cladding, comprising:
a first imaging unit comprising a first light irradiation source and a first imaging sensor;
the first light irradiation source is positioned on one side of the plastic optical fiber, and the first imaging sensor is provided on the opposite side of the plastic optical fiber from the first light irradiation source; and
a data processing apparatus coupled to receive image data on the plastic optical fiber from the first imaging unit,
wherein the first light irradiation source is disposed so that a ratio (D/W) of a shortest distance D to a light emission width W is in a range of 0.9 to 1.3 where W is the light emission width of the first light irradiation source and D is the shortest distance between a light emission position of the first light irradiation source and the side of the plastic optical fiber, and
wherein the data processing apparatus receives a light intensity distribution in a radial direction of the plastic optical fiber from the image data on the plastic optical fiber and to calculate the core diameter of the plastic optical fiber based on the light intensity distribution.

6. The apparatus for measuring the core diameter of the plastic optical fiber according to claim 5,
comprising a second imaging unit containing a second light irradiation source and a second imaging sensor which are position in a different in orientation to the first light irradiation source and the first imaging sensor, and
wherein the data processing apparatus is coupled to receive image data on the plastic optical fiber from the first imaging unit and the second imaging unit.

7. The apparatus for measuring the core diameter of the plastic optical fiber according to claim 6,
wherein the first imaging unit and the second imaging unit are arranged in different orientations with respect to the plastic optical fiber.

8. The apparatus for measuring the core diameter of the plastic optical fiber according to claim 5,
wherein the arrangement of the first imaging unit relative to the plastic optical fiber is changeable.

9. The apparatus for measuring the core diameter of the plastic optical fiber according to claim 5,
wherein the data processing apparatus further calculates a cladding diameter based on a light intensity distribution in a radial direction of the plastic optical fiber.

10. The apparatus for measuring the core diameter of the plastic optical fiber according to claim 9,
wherein the data processing apparatus further calculates an eccentricity of the plastic optical fiber based on the calculated core diameter and cladding diameter of the plastic optical fiber.

11. A method of detecting a defect in a plastic optical fiber, comprising:
an imaging step comprising irradiating a side of the plastic optical fiber with a light irradiation source directing light toward the side of the plastic optical fiber and imaging an opposite side of the plastic optical fiber from the irradiated side with an imaging sensor; and
a data processing step of processing image data on the plastic optical fiber obtained by the imaging sensor,
wherein, in the imaging step, the light irradiation source and the plastic optical fiber are disposed so that a ratio (D/W) of a shortest distance D to a light emission width W is in a range of 0.9 to 1.3 where W is the light emission width of the light irradiation source and D is the shortest distance between a light emission position of the light irradiation source and the irradiated side of the plastic optical fiber,
wherein, in the imaging step, the light irradiation and the imaging are performed on the plastic optical fiber from at least two directions obtaining image data on at least two sides of the plastic optical fiber which are different in orientation, and
wherein, in the data processing step, at least two light intensity distributions on the side of the plastic optical fiber are obtained from the at least two image data, and a defect in the plastic optical fiber is detected based on the at least two light intensity distributions.

12. An apparatus for detecting a defect in a plastic optical fiber, comprising:
a first imaging unit comprising a first light irradiation source and a first imaging sensor;
the first light irradiation source is positioned on one side of the plastic optical fiber; and
the first imaging sensor facing the first light irradiation source;
and
a second imaging unit containing a second light irradiation source and a second imaging sensor which are position in a different orientation to the first light irradiation source and the first imaging sensor,
the first imaging unit and the second imaging unit are arranged in different orientations with respect to the plastic optical fiber,
a data processing apparatus coupled to receive image data on the plastic optical fiber from the first imaging unit and the second imaging unit,
wherein the first and the second light irradiation sources are disposed so that a ratio (D/W) of a shortest distance D to a light emission width W is in a range of 0.9 to 1.3 where W is the light emission width of the first and the second light irradiation sources and D is the shortest distance between a light emission position of the first and the second light irradiation sources and the side of the plastic optical fiber.

13. A method of detecting a defect in a plastic optical fiber, comprising:
an imaging step comprising irradiating a side of the plastic optical fiber with at least three light irradiation sources directing light toward the plastic optical fiber and imaging an opposite side of the plastic optical fiber from the irradiated side with at least three imaging sensors each facing one of the at least three light irradiation sources; and
a data processing step of processing the at least three image data obtained by each of the three imaging sensors,
wherein, in the imaging step, each of the at least three light irradiation sources and the plastic optical fiber are disposed so that a ratio (D/W) of a shortest distance D to a light emission width W is in a range of 0.9 to 1.3 where W is the light emission width of each of the at least three light irradiation sources and D is the shortest distance between a light emission position of each of the at least three light irradiation sources and the side of the plastic optical fiber, and
wherein, in the data processing step, at least three light intensity distributions on the side of the plastic optical fiber are obtained from the at least three image data, and a defect in the plastic optical fiber is detected based on the at least three light intensity distributions.

14. An apparatus for detecting a defect in a plastic optical fiber, comprising:
a first imaging unit comprising a first light irradiation source and a first imaging sensor;
a second imaging unit containing a second light irradiation source and a second imaging sensor which are position in a different orientation to the first light irradiation source and the first imaging sensor; and
a third imaging unit containing a third light irradiation source and a third imaging sensor which are position in a different orientation to the first and second light irradiation sources and the first and second imaging sensors,
each of the three light irradiation sources are positioned on one side of the plastic optical fiber; and each of the three imaging sensors are provided on the opposite side of the plastic optical fiber from the first light irradiation source
a data processing apparatus coupled to receive image data on the plastic optical fiber from the first imaging unit, the second imaging unit and the third imaging unit,
wherein the first, second and the third light irradiation sources are disposed so that a ratio (D/W) of a shortest distance D to a light emission width W is in a range of 0.9 to 1.3 where W is the light emission width of the first, second and the third light irradiation sources and D is the shortest distance between a light emission position of the first, second and the third light irradiation sources and the side of the plastic optical fiber.

15. The method of measuring the core diameter of the plastic optical fiber according to claim 1, wherein the light irradiating source is a light source is selected from the group consisting of a light emitting diode, a laser, and a halogen lamp.

16. The method of measuring the core diameter of the plastic optical fiber according to claim 1, wherein the imaging sensor is a line sensor camera or an area sensor camera.

17. The apparatus for measuring the core diameter of the plastic optical fiber according to claim 5, wherein the first light irradiating source is a first light source is selected from the group consisting of a light emitting diode, a laser, and a halogen lamp.

18. The apparatus for measuring the core diameter of the plastic optical fiber according to claim 5, wherein the first imaging sensor is a line sensor camera or an area sensor camera.

* * * * *